United States Patent [19]

Ballinger

[11] 3,845,499

[45] Oct. 29, 1974

[54] APPARATUS FOR ORIENTING MAGNETIC PARTICLES HAVING A FIXED AND VARYING MAGNETIC FIELD COMPONENT

[75] Inventor: Dale O. Ballinger, Denver, Colo.

[73] Assignee: Honeywell Inc., Minneapolis, Minn.

[22] Filed: Mar. 26, 1973

[21] Appl. No.: 344,975

Related U.S. Application Data

[60] Continuation of Ser. No. 216,862, Jan. 10, 1972, abandoned, which is a division of Ser. No. 861,019, Sept. 9, 1969, Pat. No. 3,683,382.

[52] U.S. Cl. .................................. 360/56, 360/110

[51] Int. Cl. .......................................... G11b 5/02

[58] Field of Search ............ 274/41.4; 179/100.1 R, 179/100.1 B, 100.2 R, 100.2 CB, 100.2 A, 100.2 B, 100.2 D; 346/74 M, 74 ES, 74 MP, 74 TP; 178/6.6 A, 6.6 TP; 340/173, 174.1 M; 117/36.1, 235, 238, 240, 234

[56] References Cited

UNITED STATES PATENTS

| | | | |
|---|---|---|---|
| 3,117,065 | 1/1964 | Wooten | 179/100.2 A |
| 3,171,106 | 2/1965 | Lemmond | 346/74 TP |
| 3,370,132 | 2/1968 | Flanders | 179/100.2 CB |

FOREIGN PATENTS OR APPLICATIONS

| | | | |
|---|---|---|---|
| 95,523 | 4/1939 | Sweden | 179/100.1 B |
| 830,736 | 3/1960 | Great Britain | 179/100.2 CB |

OTHER PUBLICATIONS

Bertelsen et al., Improvement in Magnetic Recording, IBM Tech. Disclosure Bulletin, Vol. 3, No. 10, page 31, 3/61.

*Primary Examiner*—Raymond F. Cardillo, Jr.
*Attorney, Agent, or Firm*—Arthur H. Swanson; Lockwood D. Burton; Mitchell J. Halista

[57] ABSTRACT

A recording medium is shown which is responsive to a magnetic or an electrostatic field for recording an input signal thereon having a continuous web of an encapsulating or entrapping material containing a suspension of highly reflective flakes. Exposure to a magnetic or an electrostatic field reorients the preoriented flakes to provide a contrast between the exposed portions of the recording medium and the unexposed portions thereof.

3 Claims, 9 Drawing Figures

APPARATUS FOR ORIENTING MAGNETIC PARTICLES HAVING A FIXED AND VARYING MAGNETIC FIELD COMPONENT

This is a continuation of application Ser. No. 216,862, filed on Jan. 10, 1972, now abandoned, which was a divisional application of application Ser. No. 861,019, filed on Sept. 9, 1969, now U.S. Pat. No. 3,683,382.

The present invention relates to a recording medium; and, more particularly, to a recording medium which responds to force fields for changing the contrast between that portion of the recording medium exposed to the force fields and the unexposed portions thereof.

There are many methods and procedures known in the prior art which provide a means for viewing a force field such as a magnetic or an electrostatic field. One of the best known methods for viewing a magnetic force field, for example, consists of a primary school experiment wherein iron filings are placed upon a piece of white paper and a magnet is brought into contact with the lower surface. The iron filings orient themselves around the poles of the magnet for outlining the flux pattern thereof. This principle has been utilized for viewing a recording made upon a magnetic tape by a magnetic tape recording system. Here, iron filings are suspended within a fluid, such as carbon tetrachloride or toluene, and the recorded tape is drawn therethrough. The suspended iron particles adhere to that portion of the tape upon which a signal has been recorded for providing a visual indication of the recording.

As the magnetic tape industry developed, it became desirable to provide a rapid visual means for checking that an input signal had actually been recorded upon a piece of magnetic tape. The method of washing the tape through a suspension of iron filings was completely unacceptable. As a result of this, a shutter technique was developed. The shutter technique utilizes a recording medium which is coated with a magnetic material and then exposed to a magnetic field. The magnetic field causes particles within the coating to reorient themselves for providing a transparency through the coating material thus establishing a contrast for visualizing the magnetic field. A paper describing this approach was written by: Suchow, Lawrence, "New Method for Making Magnetic Fields Visible." *Journal of Applied Physics*, (Feb. 1958), 223–224. In this paper, Suchow disclosed the utilization of plate-like crystals of alpha-$Fe_2O_3$ which are slightly ferromagnetic. These crystals are suspended in a liquid and, due to their weak ferromagnetism, are not strongly attracted to a magnetic field but rather reorient in response thereto while retaining their general position. This creates a transparency of the suspension, in the area where the plates are magnetically reoriented parallel to the line of sight, for providing a visual representation thereof. This shutter technique is also utilized within a patent by R.J. Younquist, et al. No. 3,013,206, which issued Dec. 12, 1961 from a filing date of Aug. 28, 1958. This device utilized flat, visible, weakly ferromagnetic crystals suspended in a liquid which orient themselves in a magnetic field. The crystals specifically referred to are alpha-$Fe_2O_3$ crystals, and the phenomenon described is the so called shutter technique.

About this same time, another approach was suggested for providing a solution to the problem of viewing a magnetic force field. This solution is disclosed in a patent by L. Schleicher, et al., No. 2,971,916, which issued Feb. 14, 1961 from a filing date of Jan. 30, 1957. This arrangement teaches the encapsulation of magnetic iron oxide particles within a capsule constructed with a wall of hardened organic colloid material which enclosed an oily liquid containing the magnetic particles. These encapsulated particles are spread over a recording medium, such as a magnetic tape, and provide a visual indication of a magnetic signal through the shutter technique described hereinabove. A second patent by L.S. Trimble, No. 3,320,523, which issued May 16, 1969 from a filing date of Feb. 1, 1965 also illustrates the shutter technique. The thrust of this invention discloses the utilization of acicular shaped particles which are oriented within a water phase suspension. The patent discloses that water phase suspension reduces the light absorbed by the capsule walls and oil utilized in prior art devices, such as the Schleicher patent.

There are further techniques which provide a visual indication of a magnetic field. For example, a chemical agent has been encapsulated in capsules having a brittle shell. The chemical agent is magnetostrictive and undergoes a dimensional change when exposed to a magnetic field. This dimensional change ruptures the brittle shell forming the capsules and allows the chemical agent therein to react with the coating material surrounding the capsule for causing a color change and rendering the magnetic field visible.

Still another prior art method of obtaining a visual indication of a force field, for example an electrostatic field, utilizes a thermoplastic film containing flake-like particles. An optical transparency can be produced by heating the film while applying a pattern of electric fields to locally orient the particles. These fields are controlled by an adjacent photoconductive layer, allowing an input optical image to be recorded. This approach is discussed in an article by Kacan, B., et al., "Image Recording by Particle Orientation." *Proceeding of the IEEE*, (March 1968), 338–339.

A final example of the prior art is illustrated in a patent by G. T. Brown, Jr. et al., U.S. Pat. No. 3,221,315, which issued Nov. 30, 1965 from a filing data of June 25, 1962. This patent illustrates a further refinement of the shutter technique wherein a base member is provided with a fixed light responsive characteristic. A magnetic field sensitive coating is applied over the base member, and a magnetic field is then applied to the recording medium, thus formed. The coating undergoes a variation of its light responsive characteristic for cooperating with the base member to represent a visual recording of the magnetic field applied thereto.

In spite of the continuing development of a recording medium, which records by providing a visual indication of a force field, a particle recording medium is not available that will provide sufficient visual contrast between the background, or unexposed portions of a recording medium, and the portions thereof exposed to the force field. The main reason for the lack of sufficient contrast is that the shutter technique relies on the force field, in most cases a magnetic field, to orient the magnetic particles within the capsules such that electromagnetic energy, in the form of visible light, may be transmitted therethrough. This arrangement is insufficient to provide the necessary contrast; and, therefore, the development of a recording medium utilizing this technique has not gained commercial acceptance.

The present invention comes about through a realization that the shutter technique is inadequate. The present invention seeks to replace the shutter technique with a more affective technique which provides a higher contrast between the background and that portion of the recording medium which has been exposed to a force field.

Accordingly, it is an object of the present invention to provide a new recording medium which has the ability of immediately producing an image thereon in response to a force field such as a magnetic or an electrostatic field.

Another object of the invention presented here provides a recording medium which is responsive to a magnetic or an electrostatic force field and which responds to that force field by producing a recording trace having a substantially high contrast with respect to the background or unexposed portion of the recording medium.

Still another object of this invention provides a recording medium which may be immediately imaged to provide a permanent recording of an input signal that is impervious to abrassive mechanical wear or to chemical reaction and which may be easily erased through the use of a reorienting force field.

Yet another object of the present invention is to provide a recording apparatus in which the recording medium of the present invention may be utilized.

Yet still another object of the present invention provides a recording medium which is useful within a recording apparatus to record and visually display input information and to retrieve that recorded information when required for reproducing it as output information.

A further object of this invention provides a means for recording upon a recording medium without creating the necessity for contacting that medium and wherein the recording thereon may be erased and reused.

Still a further object of the present invention is to provide a recording medium which may be utilized in place of a recording medium normally used with a pen and ink system thereby eliminating the problems associated therewith, such as clogging of the pen and the inconvenience generally associated with the ink.

Yet a further object of the present invention is to provide a recording medium which may be utilized within a high frequency recording system wherein the speed of the recording system may be increased through the reduction of the mass of the writing member and the elimination of the frictional contact between the writing member and the recording medium.

In accomplishing these and other objects, there has been provided a continuous web of encapsulating material containing a fluid in which highly reflective, flake-like particles are suspended. Exposure of the recording medium to a force field reorients the flake-like particles for providing a visible contrasting trace between the exposed and unexposed portions of the recording medium.

Other objects and many of the attendant advantages of the present invention will become readily apparent to those skilled in the art as a better understanding thereof is obtained by reference to the following detailed description when considered in connection with the accompanying drawings, wherein.

Figure 1:
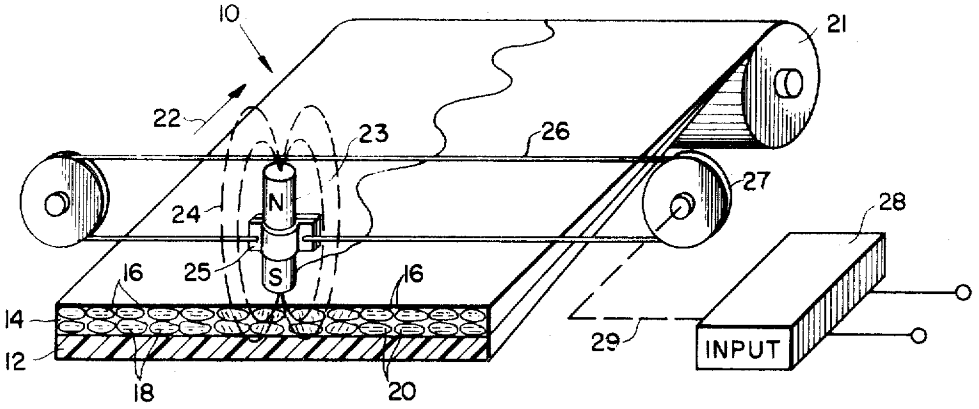
FIG. 1 is a perspective view, showing the recording medium of the present invention embodied schematically within a recording apparatus for exposing the recording medium to a force field established in the embodiment of a magnetic field.

Referring now to the drawings, FIG. 1 shows a recording medium 10 including a substrate member 12 and a field sensitive web member 14, sensitive to a force field, such as a magnetic or an electrostatic field. The present invention may be practiced without a substrate 12 wherein the field sensitive web member 14 forms a continuous, self supporting web. The substrate 12, when used, may comprise various materials, such as paper, clear plastic, nonmagnetic foil, or magnetic tape. While any of these materials may be utilized within the present invention, the invention will be described as if the substrate were a clear plastic, such as polyethylene terephthalale. The reason for this will become more apparent hereinbelow; however, for now it is sufficient to say that the description of the recording medium without a substrate or as a substrate of clear plastic more specifically point out the novelty of the present invention. That is, the present invention does not utilize the shutter technique for creating a transparent coating which is contrasted against a base, as in the prior art.

The field sensitive web member 14 is formed from transparent material having a multitude of tiny fluid containing chambers 16 in which are suspended highly reflective flake-like particles 18. The fluid containing chambers 16 may be formed by entrapping tiny droplets of fluid and particles in a clear resin which may then be coated upon the substrate 12. The fluid containing chambers 16 may also be formed by encapsulating tiny droplets of fluid and particles within individual capsules which may then be coated upon the substrate 12. While other methods are available, the present invention shall describe the field sensitive web member 14 as formed from individual capsules 16. However, it is to be understood that this is not intended to limit the present invention to this arrangement.

The flake-like particles 18 may be formed from paramagnetic or ferromagnetic material, such as iron, nickel or stainless steel; from nonmagnetic material such as aluminum; or from a combination of both magnetic and nonmagnetic materials, such as nickel plated aluminum. One of the important features of the particles 18 is that they be substantially flake, disc, plate or leaf-shaped and not acicular, as in the prior art. The present invention shall refer to the particles as flake-like particles, but it is to be understood that this is a descriptive term and not meant to limit the flat, broad shape of the material. The flake-like particles range in surface size from 10 to 50 microns with an average thickness of 1 micron. Each flake-like particle therefore has an aspect ration between 5 to 1 and 50 to 1. A second important feature of the flake-like particles is that they are highly reflective. Reflectivity or the reflection coefficient is defined as the ratio of the reflected radient energy which is reflected from a surface to the total incident radient energy which strikes that surface. This coefficient may refer to defussed or to specular reflection and in general varies with the angle of incidence and with the wavelengths of the ambient light. For example, physics handbooks indicate that the reflectivity of polished nickel varies from 0.37 to 0.95 depending on the wavelength of the normally incident light; while steel varies between 0.33 to 0.93. In the present invention, it has been found that the flake-like particles should be polished to form a reflective surface having an average reflectivity of 0.4 or more. It is also desirable to describe the contrast of the reflective flake-like particles before and after exposure to a force field. The reflection density ($D$) may be used:

$$D = -\operatorname{Log}_{10}(R_D).$$

Where ($R_D$) is the average reflectivity of the recording medium. Thus, the reflective density for a recorded trace or the area exposed to a force field should be greater than 1.2; while the unrecorded area of the recording medium should have a reflective density of less than 0.8.

The highly reflective, flake-like particles 18 may be formed into the field sensitive web member 14 by placing the flakes in an encapsulating fluid 20. The encapsulating fluid 20 may be one of several fluids such as water, oil or alcohol. In the preferred embodiment, a mixture of oils has been utilized including a mixture of magnaflux oil and airoclor oil. These oils have been mixed to match the index of refraction of the material which forms the capsule wall. The highly reflective flake-like particles 18 are placed within the encapsulating fluid and ball milled with a wetting agent until the flakes and encapsulating fluid are completely mixed. The suspension of flakes and oil is then placed in water. Prior to the addition of the encapsulating materials the pH of the suspension adjusted to above 9.5 and the temperature raised above the gelation temperature. The encapsulating material is then added and the system agitated until the desired droplet size of the oil-in-water emulsion is attained. The pH of this system is then reduced to initiate coacervation between the fractions of the polymers. The encapsulating material may be a gum arabic aqueous solution or a gelletin aqueous solution or both.

Referring once again to FIG. 1, the recording medium 10 is shown schematically as it is rolled upon a take-up roller 21 in the direction of the arrow 22. Recording upon the recording medium 10 may be achieved through several methods for establishing a force field, such as a magnetic or an electrostatic field. A magnetic recording field may be established in several ways, such as: by moving a permanent magnet across the recording medium in response to an input signal, by a multistylus recording head having a single stylus actuated as an input signal varies, by utilizing a magnetic recording head, or by a plurality of light sensitive diodes connected to individual stylus and actuated by a light beam responsive to an input signal for energizing one of the stylus. An electrostatic recording field may be established, for example, by placing a charge upon a probe moving adjacent to the recording medium in response to an input signal. Recording in FIG. 1 is achieved simply by a permanent magnet 23 having a flux field represented schematically by the dashed lines 24. The magnet 23 is shown schematically mounted within a collar 25 attached by a cable 26 to suitable driving pulleys 27. The pulleys 27 are driven in response to an input signal received by an input device 28 which drives the pulleys through a suitable driving mechanism, shown as a dashed line 29. The flux field 24 penetrates the field sensitive web member 14 for reorienting the preoriented highly reflective flake-like particles 18, which in this embodiment are magnetically sensitive. This reorientation creates a contrast between the portion of the recording medium 10 which has not been exposed to the flux field 24 and the exposed portion thereof. In the present invention, the contrast or net density difference has been found to be over 0.4; where the contrast or net density difference is defined as the difference in reflection density between the area of the recording medium exposed to the magnetic field and the area of the recording medium which has not been exposed to the magnetic field.

Figure 2:
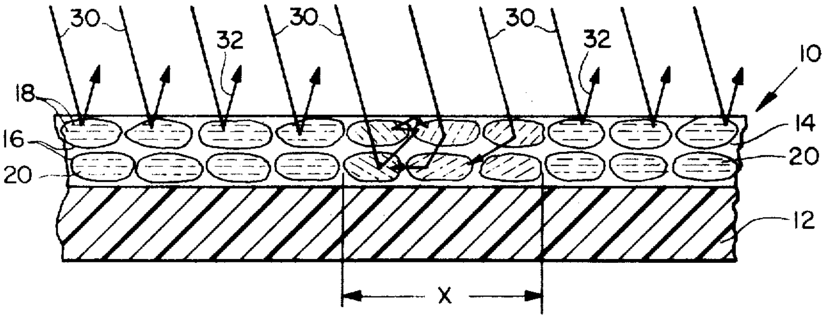
FIG. 2 is an enlarged cross-sectional view of the recording medium useful in explaining the operation of the present invention.

Referring now to FIG. 2, the recording operation of the highly reflective, magnetic flake-like particles 18 within the fluid containing capsules 16 of FIG. 1 will be described. First, the highly reflective magnetic flake-like particles 18 are oriented in a position substantially parallel to the plane of the substrate member 12. Obviously, not all flakes are parallel; but statistically more flakes are oriented parallel to the substrate than are otherwise positioned. This orientation may be achieved by several methods, one of which will be described hereinbelow with regard to FIG. 3. The presence of a magnetic field, such as that generated by the permanent magnet 23, reorients the reflective, magnetic flake-like particles 18 within their capsules 16. In FIG. 2, the recording trace illustrated in FIG. 1 is shown having a width indicated by X. In this area, the reflective, magnetic flake-like particles 18 are reoriented so that some at the center of the magnetic field are substantially perpendicular to the substrate; while others are oriented at an angle to the substrate. Toward the edges of the magnetic field the reflective, magnetic flakes 18 are generally reoriented at an angle to the substrate as they attempt to orient parallel to the lines of flux. Incident light rays 30 striking the surface of the recording medium 10 are reflected by the highly reflective, magnetic flakes 18 and returned as reflected light rays 32 in the areas of the recording medium 10 which have not been exposed to the magnetic field. However, in the areas of the recording medium exposed to the magnetic field, the incident light rays are scattered by the multiple reflective surfaces of the magnetic flakes 18 into the magnetically sensitive web member 14 and there absorbed. This scattering prevents the light rays from being reflected out of the coating thereby creating a contrast. Thus, the trace formed by the magnetic field appears as a dark image on a light background.

It will be noted that the technique just described is achieved without the necessity of providing a light absorbing or reflecting substrate, as in prior art arrangements. The prior art discussed hereinabove primarily uses a shutter technique. The present invention produces an improved contrast or net density difference between the trace and background through the utilization of a reflective technique.

Once the trace is formed upon the recording medium, the trace remains as a permanent dark image thereon and is not destroyed by mechanical abrasion, chemical reaction, or electromagnetic energy, such as visible light. The trace demonstrates a considerable memory. It is believed that this memory is brought about by the simple fact that there are no external force acting on the reflective flakes within the capsules which would create realignment. Another explanation for this phenomenon is that the flake-like particles form overlapping shingle-like formations within the irregularly shaped capsules which frictionally engage the inner surfaces thereof and are not easily dislodged unless reexposed to a second force field. Thus, it has been found that the dark image provided upon the recording medium of the present invention remains until erased by a second force field. Therefore, a second substrate of magnetic oxide, such as a strip of magnetic tape, is not necessary to provide a memory, as in some prior art devices. It has also been found that the present invention will provide a read out similar to magnetic tapes. This phenomenon will be further discussed hereinbelow.

Figure 3:
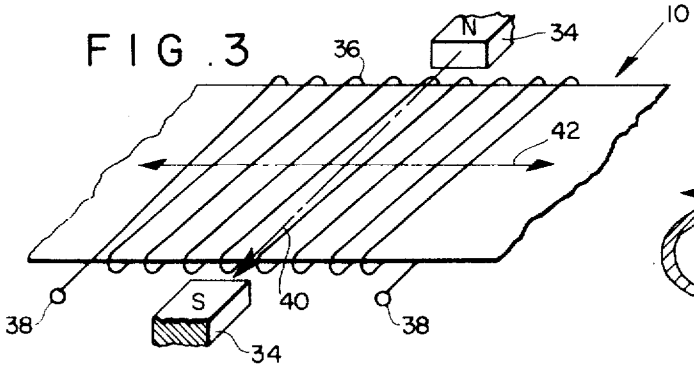
FIG. 3 is a perspective view, showing a convenient method for preorienting or erasing the recording medium prior to recording or re-recording.
Figure 4:
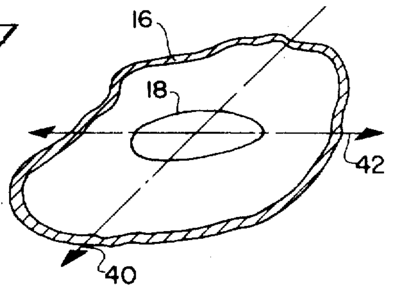
FIG. 4 is an enlarged cross-sectional view of an individual capsule and a flake-like particle during the preorienting operation of FIG. 3.

Referring to FIG. 3, a means is illustrated for preorienting the highly reflective, magnetic flake-like particles 18 within a plane parallel to the plane of the magnetically sensitive web member 14. A fixed magnetic field is established parallel to one axis of the substrate 12 by a pair of permanent magnets 34. In a mutually perpendicular axis of the substrate 12 and at different intervals of time, a second magnetic field is produced which combines with the first field to orient the flakes 18 parallel to both axes of the web member 14 and substrate 12. The second magnetic field is formed by a coil 36 having input terminals 38 across which an A.C. signal is applied. The flux established by the permanent magnet 34 is illustrated by the dashed line 40, while the flux generated by the coil 36 is illustrated by a dashed line and double arrowhead 42. FIG. 4 illustrates a single fluid containing capsule 16 in which a highly reflective, magnetic flake-like particles 18 has been oriented by the flux fields 40 and 42. The method just described for reorientation of the reflective flake-like particles 18 is also utilized to erase a recording trace once established upon the recording medium 12. It has been found that erasing with an all A.C. field arrangement provides improved orientation of the flake-like particles. It is believed that a D.C. field allows the particles, especially magnetic particles, to form fixed poles which tend to align themselves with one another once the D.C. field is removed. This causes some of the particles to return to a position other than the desired position once the field is removed. An A.C. field, however, decreases gradually and prevents the particles from forming poles, thus allowing them to remain in the oriented position intended.

Figure 5:
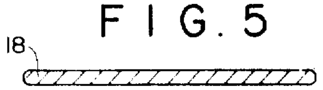
FIG. 5 is an enlarged cross-sectional view of an individual reflective flake-like particle embodied within the present invention.

The reflective flake-like particles 18 illustrated in FIGS. 1 through 4 may be formed from several magnetic materials, such as iron, nickel or stainless steel, as mentioned hereinabove. Through experimentation it has been found that a reflective magnetic flake constructed from nickel produces a better contrast while a reflective flake constructed from stainless steel provides a lighter background. However, aluminum flakes have a significantly higher value of reflectance than those mentioned here. As the reflectance essentially determines the amount of contrast which can be obtained between the trace and the background in the present invention, any improvement is of significant value. FIG. 5 illustrates a cross-sectional view of the reflective flake-like particles 18 shown in FIG. 4. When the force field is established by an electrostatic force, the flakes may be constructed from polished aluminum. A charged probe, for example, causes an aluminum flake to act as an electric dipole for reorienting the flake in the presence of the electrostatic field. While aluminum flakes provide a recording trace having a high contrast for recording by use of an electrostatic field, the same electrostatic field will affect the magnetic flakes for providing a recording. However, the aluminum flakes will not react to a magnetic field. It has been found that the recording medium will react faster to an electrostatic field than a magnetic field. That is, a short electrostatic pulse will cause a trace to appear upon a recording medium before a magnetic pulse of the same duration would create a trace. The reason for this is that an electrostatic pulse creates a charge upon the field sensitive web member 14 which remains after the pulse is removed.

Figure 6:
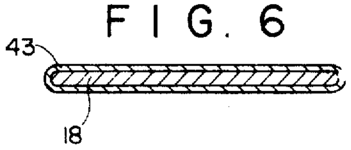
FIG. 6 is a cross-sectional view, similar to FIG. 5, showing a second reflective flake-like particle embodied within the present invention.

Referring now to FIG. 6, a reflective flake-like particle 18 is shown which may be formed from aluminum. This aluminum flake has been rendered magnetic by coating it with a magnetic metal film 43, as by vacuum depositing or electroless plating. The film 43 is arranged a few angstroms thick so as to be thinner than the shortest wavelength of visible light. This arrangement preserves the optical properties of the aluminum while rendering the flake magnetic. Thus, the high reflectance of aluminum may be utilized in combination with a magnetic field to provide a high contrast recording trace.

Figure 7:
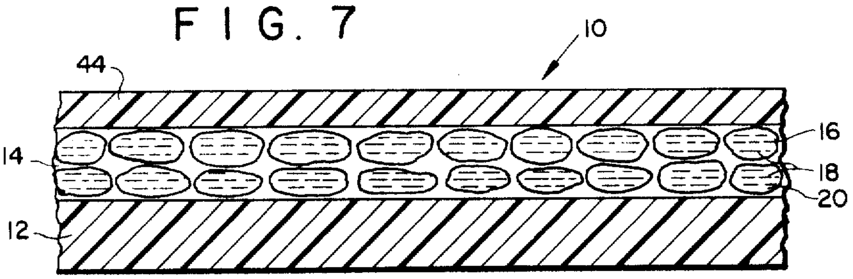
FIG. 7 is a cross-sectional view, similar to FIG. 2, showing a second embodiment of the present invention.
Figure 8:
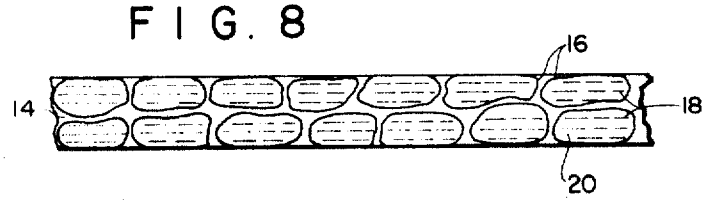
FIG. 8 is a cross-sectional view, similar to FIG. 7 showing still another embodiment of the present invention.

In experimenting with the recording medium 10, it has been found that exposing the field sensitive web member 14 to a force field through the substrate 12 produces a better contrast than exposure thereof from the web side. The reason for this is believed to be that the sensitive web member 14 is formed from many spherically shaped encapsulating particles 16. Due to the spherical surfaces of the fluid containing capsules 16, the incident light rays are scattered as they reflect from the highly reflective, flake-like particles 18. This is caused by the refraction as the light passes through the walls of the fluid containing capsules 16. To improve this, a second transparent material is placed over the sensitive coating, thereby sandwiching the coating between two transparent substrates. The transparent coating 44, FIG. 7, presents a smooth surface which reduces the refraction and improves the reflection of incident light striking the recording medium 10. This has the tendency of improving the contrast between the recording trace and that portion of the recording medium which is unexposed to a force field, such as a magnetic or an electrostatic field. A second arrangement for accomplishing the improved contrast of the sandwich configuration is to form the field sensitive web member 14 as a single continuous, self-supporting web having flat surfaces, FIG. 8. That is, the mixture of the encapsulating material and the oil-in-water emulsion is rolled into a flat continuous web before the coacervation between the fraction of the polymers is completed. This allows the capsules to be deformed along the outer surfaces thereof for forming a flat continuous surface.

In accordance with the present invention, the field, sensitive web member 14 is preoriented to align the highly reflective, flake-like particles 18 contained therein in a plane parallel to the plane of the web. When the recording medium is exposed to a force field, the reflective, flake-like particles 18 are realigned for providing a substantial contrast between the preoriented, reflective area which has not been exposed to the force field and that area which has been exposed. The recording paper of the present invention provides an economical medium, costing less than one-half a cent per square foot. The recording medium responds quickly to a magnetic or an electrostatic field, in less than 3 microseconds, to provide an immediate indication of an input signal thereon. If an input signal is provided in the form of pulses, a pulse duration of less 1.5 microseconds is required to produce a recording. As indicated hereinabove, this pulse is even shorter if provided by an electrostatic field.

Figure 9:
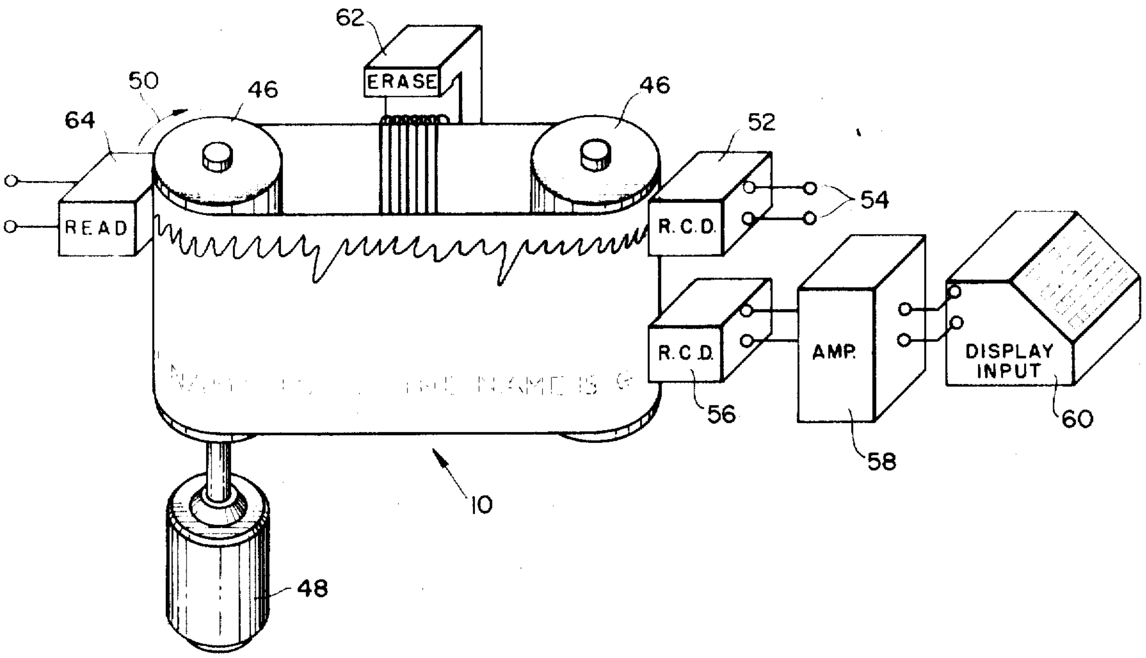
FIG. 9 is a perspective view, showing a recording apparatus which embodies the recording medium of the present invention.

The field sensitive recording medium of the present invention may be utilized within several recording apparatus. One example of such an apparatus is illustrated in FIG. 9. Here the recording medium 10 is illustrated as a continuous belt which is drawn across a pair of rollers 46 by a suitable driving motor 48 in the direction indicated by arrow 50. A recording head 52, such as a multiple stylus head or a magnetic head, is arranged adjacent to the recording medium 10 for recording an analog input signal thereon which is received from input terminals 54. A second recording head 56 may be arranged for recording alphanumeric characters upon the recording medium 10. The recording head 56 is driven by an amplifier 58 and suitable input means 60. The input means provides a display upon the recording medium which may be retained thereon or erased by an erase head 62, similar to that shown in FIG. 3. The information recorded by the recording head 52 may be read by a reproduce head 64 which provides for retrieval of the recorded input information. Thereafter, the signal may be erased by the erase head 62. It should be noted that the reading of the recording medium may be achieved in a manner similar to magnetic tape. That is, the reorientation of the reflective, magnetic flake-like particles 18 within the recording medium 10 provides a discontinuity within the recording medium which may be detected by the magnetic reproduce head 64. Thus, it will be seen that the present invention may be utilized to provide a recording medium capable of visually displaying input information and capable of reproducing the input information at a later time.

Further examples of specific applications for the recording medium described herein are the utilization thereof within an X–Y recorder or a chart recorder. These recorders generally utilizes a pen and ink arrangement to write upon the recording medium. By utilizing, for example, a permanent magnet, the pen and ink may be eliminated thus eliminating many problems associated with pen an ink recording. Further, the frequency response of the recorder will be immediately increased as the inertia of the magnet is substantially less than the inertia of the pen and ink writing member and there need be no frictional contact between the permanent magnet and the recording medium.

Obviously, many modifications and variations of the present invention will become apparent to those skilled in the art in light of the above teaching; and, therefore, the present invention should be limited only by the appended claims.

The embodiments of the invention in which are exclusive property or privilege is claimed are defined as follows:

1. A means for orienting magnetic particles comprising:

means defining a predetermined volume capable of receiving magnetic particles to be oriented and associated magnetic particle support means therein and producing a first fixed magnetic field in said predetermined volume and having all magnetic field components within said volume substantially parallel to a plane passing through said volume and means for producing a second magnetic field having a component with a periodically varying amplitude and direction within said volume, said means for producing a second magnetic field including a coil arranged to be energized by an alternating current signal to produce an alternating magnetic field having a field component within said predetermined volume and in said plane and said coil having an elongated cross section encompassing said predetermined volume, said component of said second magnetic field combining with first magnetic field to form a magnetic field vector having a plane of rotation lying wholly within said plane.

2. A means for orienting magnetic particles as set forth in claim 1 wherein said means for producing a first fixed magnetic field includes a permanent magnet aligned with said predetermined plane.

3. A means for orienting magnetic particles as set forth in claim 2 wherein said permanent magnet has a first end face perpendicular to said plane and located adjacent to a first edge of said volume and a second end face perpendicular to said plane and located adjacent to a second edge of said volume, said second edge being located across said plane from said first edge.

* * * * *